3,534,011
HEAT CURABLE COMPOSITION
David S. Breslow, Wilmington, Del., assignor to Hercules Incorporated, Wilmington, Del., a corporation of Delaware
No Drawing. Filed May 29, 1968, Ser. No. 732,895
Int. Cl. C08f *27/00*
U.S. Cl. 260—94.9                                6 Claims

ABSTRACT OF THE DISCLOSURE

Disclosed is a heat curable composition comprised of a peroxide curable polymer, such as polyethylene, and a peroxydioxolan-4-one.

---

This invention relates to cross-linking of polymeric materials with peroxides and more particularly to the cross-linking of peroxide curable polymers with peroxydioxolan-4-ones.

In accordance with this invention it has been found that compositions of a peroxide curable polymer and a cross-linking amount of a peroxide of the general formula

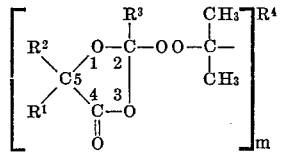

where $m$ is 1 or 2, $R^1$ and $R^2$ taken individually are ($C_1$–$C_{18}$) alkyl, ($C_6$–$C_{14}$) aryl, ($C_7$–$C_{18}$) aralkyl, ($C_7$–$C_{18}$) alkaryl, and the sum of $R^1$ and $R^2$ does not exceed $C_{20}$; or $R^1$ and $R^2$ taken together is —$C_nH_{2n}$— where $n=2, 3, 4,$ or 5, $R^3$ is ($C_1$–$C_7$) alkyl, phenyl, ($C_7$–$C_{10}$) alkaryl, ($C_7$–$C_{10}$) aralkyl, or methoxy ($C_7$–$C_{10}$) aralkyl, and $R^4$ is ($C_1$–$C_2$) alkyl or phenyl when $m=1$, and phenylene or ($C_2$–$C_4$) alkylene when $m=2$, are readily crosslinked by heating the composition.

The peroxides of the above general formula can be prepared by the following reactions

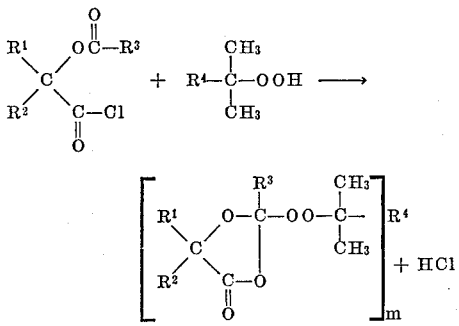

where $R^1$, $R^2$, $R^3$, and $R^4$ are as designated hereinabove and $m=1$ where $R^4$ is monovalent and 2 where $R^4$ is divalent.

The preferred peroxides are those in which the R groups are $C_1$–$C_4$ alkyl.

It is well known that polyethylene, natural rubber, polystyrene, polyisoprene, cis-4-polybutadiene, poly(chloroprene), silicone rubber, ethylene-propylene copolymer, terpolymers of ethylene, propylene and a diene, styrene butadiene rubbers, and nitrile-butadiene rubbers, are improved by compounding with peroxides and heating to the curing or cross-linking temperature.

These polymers are compounded with a small percentage of peroxide, usually in the range of from about 0.1% to about 5% phr., in an amount sufficient for cross-linking and heated. Mixtures of the above peroxides can be used if desired. The compounding can be carried out by mixing on a two-roll mill or by use of any of the mixing devices known in the rubber compounding art. The compounded compositions can contain the usual black or nonblack fillers known in this art.

Advantages of curing with peroxides of the present invention lie in their stability at compounding temperatures without scorch and their ability to cure at a cure temperature within the stability temperature range of the polymers.

Compounding of compositions containing polymer compounded with the peroxides of this invention and subsequent curing is exemplified by the following examples wherein all parts and percentages are by weight and phr. represents parts per hundred of polymer.

EXAMPLE 1

Polyethylene (low density) is milled on a two-roll mill at 240° C. and one phr. 2,5-dimethyl-5-hexyl-2-t-butylperoxy-1,3-dioxolan - 4 - one ($R^1=C_6H_{13}$, $R^2=CH_3$, $R^3=CH_3$, $R^4=CH_3$, $m=1$) is spread on the warm polymer and mixed on the mill with cross-cutting and end rolling with complete mixing accomplished in about 4 minutes. The sheeted composition is cut into strips 1½″ x ¾″ x 0.080″ and placed in a mold and cured. Samples are cured at 162° C., 177° C., 188° C., and 200° C. for 38, 10, 48, and 20 minutes respectively. The percent gel and swell values are determined. The results are set forth in Table I below.

EXAMPLE 2

Example 1 is repeated with peroxide used at the rate of 2 phr. The results are set forth in Table I below.

EXAMPLE 3

Example 1 is repeated using 2-isopropyl-5-methyl-5-ethyl-2-t-butylperoxy - 1,3 - dioxolan - 4 - one ($R^1=CH_3$, $R^2=C_2H_5$, $R^3=(CH_3)_2CH$, $R^4=CH_3$, $m=1$) at the same phr. rate and samples are similarly cured. The results are set forth in Table I below.

EXAMPLE 4

Example 3 is repeated with peroxide used at the rate of 2 phr. The results are set forth in Table I below.

TABLE I

| Cure | 1 | 2 | 3 | 4 |
|---|---|---|---|---|
| Cure temp., °C | 162 | 177 | 188 | 290 |
| Cure time, minutes | 38 | 10 | 48 | 20 |
| Example 1, gel percent | None | None | 74 | 74 |
| Example 1, swell | None | None | 3700 | 3460 |
| Example 2, gel percent | None | None | 73 | 73 |
| Example 2, swell | None | None | 2640 | 2740 |
| Example 3, gel percent | None | None | 79 | 78 |
| Example 3, swell | None | None | 4350 | 4450 |
| Example 4, gel percent | None | None | 76 | 74 |
| Example 4, swell | None | None | 3680 | 4150 |

The gel values set forth in Table I are determined in xylene at 110° C. for 16 hours.

It is to be understood that the above description is illustrative of the invention and not in limitation thereof.

What I claim and desire to protect by Letters Patent is:
1. A composition capable of being crosslinked by heating at a temperature above 177° C., comprising a curable polymer of the group consisting of polyethylene, natural rubber, polystyrene, polyisoprene, cis-4-polybutadiene, poly(chloroprene), silicone, rubber, ethylene-propylene, copolymer, terpolymers of ethylene, propylene and a diene, styrene-butadiene rubber and nitrile-butadiene rubber and a cross-linking amount of a peroxide of the general formula

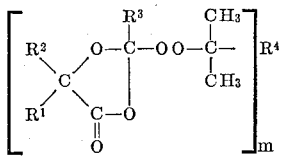

where $m$ is 1 or 2, $R^1$, $R^2$ and $R^3$ taken individually are $(C_1-C_6)$ alkyl and $R^4$ is $(C_1-C_2)$ alkyl or phenyl when $m=1$ or phenylene or $(C_2-C_4)$ alkylene when $m=2$.

2. A composition of claim 1 in which the curable polymer is polyethylene and the peroxide is a peroxide of the general formula in which $R^1$ is $C_6H_{13}$, $R^2$ is $CH_3$, $R^3$ is $CH_3$, $R^4$ is $CH_3$ and $m$ is 1.

3. A composition of claim 1 in which the curable polymer is polyethylene and the peroxide is a peroxide of the general formula in which $R^1$ is $CH_3$, $R^2$ is $C_2H_5$, $R^3$ is $(CH_3)_2CH$, $R^4$ is $CH_3$, and $m$ is 1.

4. The heat cured composition of claim 1.
5. The heat cured composition of claim 2.
6. The heat cured composition of claim 3.

References Cited
UNITED STATES PATENTS

| | | | |
|---|---|---|---|
| 3,079,370 | 2/1963 | Precopio et al. | 260—94.9 |
| 3,296,184 | 1/1967 | Portolani et al. | 260—41 |
| 3,372,139 | 3/1968 | Behr et al. | 260—41 |

JOSEPH L. SCHOFER, Primary Examiner

R. A. GAITHER, Assistant Examiner

U.S. Cl. X.R.

260—46.5, 80.7, 82.1, 82.3, 88.2, 93.5, 94.3, 97, 610

PO-1050
(5/69)

UNITED STATES PATENT OFFICE
CERTIFICATE OF CORRECTION

Patent No. 3,534,011　　　　Dated October 13, 1970

Inventor(s) David S. Breslow (Case 44)

It is certified that error appears in the above-identified patent and that said Letters Patent are hereby corrected as shown below:

Column 2 of the printed patent, In Column 4 of Table I, " 290 " should read -- 200 --.

In the Claims
Claim 1, line 70 and 71, " silicone, rubber, ethylene-propylene, copolymer, " should read -- silicone rubber, ethylene-propylene copolymer, --.

SIGNED AND SEALED

FEB. 2, 1971

(SEAL)
Attest:

Edward M. Fletcher, Jr.
Attesting Officer

WILLIAM E. SCHUYLER, JR.
Commissioner of Patents